(12) United States Patent
Hannas

(10) Patent No.: US 9,705,355 B2
(45) Date of Patent: *Jul. 11, 2017

(54) VOLTAGE REGULATOR

(71) Applicant: Trumpet Holdings, Inc., Milwaukee, WI (US)

(72) Inventor: James R. Hannas, Thiensville, WI (US)

(73) Assignee: Trumpet Holdings, Inc., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/518,273

(22) Filed: Oct. 20, 2014

(65) Prior Publication Data

US 2015/0035497 A1 Feb. 5, 2015

Related U.S. Application Data

(60) Continuation of application No. 14/202,774, filed on Mar. 10, 2014, and a division of application No. 12/960,154, filed on Dec. 3, 2010, now Pat. No. 8,681,521.

(60) Provisional application No. 61/283,404, filed on Dec. 3, 2009.

(51) Int. Cl.
*H02M 7/162* (2006.01)
*H02J 7/14* (2006.01)
*H02M 7/155* (2006.01)
*H02J 7/00* (2006.01)

(52) U.S. Cl.
CPC .......... *H02J 7/1492* (2013.01); *H02J 7/0052* (2013.01); *H02J 7/0093* (2013.01); *H02M 7/155* (2013.01); *H02J 2007/0059* (2013.01)

(58) Field of Classification Search
CPC ........ H02M 7/12; H02M 7/155; H02M 7/162; H02M 2001/0009; H02M 7/04; H02M 7/163; H02M 7/1626
USPC .... 363/85, 87, 125, 129; 320/104, 123, 128, 320/137, 142
See application file for complete search history.

(56) References Cited

U.S. PATENT DOCUMENTS

| | | | | |
|---|---|---|---|---|
| 3,315,141 A * | 4/1967 | Wright et al. | ................. | 320/137 |
| 4,016,474 A | 4/1977 | Mason | | |
| 4,179,647 A * | 12/1979 | Cummins et al. | ............ | 320/123 |
| 4,342,955 A | 8/1982 | Gant | | |
| 4,491,779 A | 1/1985 | Campbell et al. | | |
| 8,159,179 B2 | 4/2012 | Suzuki et al. | | |
| 8,681,521 B2 * | 3/2014 | Hannas | ......................... | 363/129 |

* cited by examiner

*Primary Examiner* — Gary L Laxton
(74) *Attorney, Agent, or Firm* — Ryan Kromholz & Manion, S.C.

(57) ABSTRACT

Provided are improvements for systems and methods of alternating current (AC) to direct current (DC) power regulation. The system improvements include a regulation circuit that controls a silicon controlled rectifier circuit. Method improvements include one or more of SCR load sharing, adaptive voltage droop compensation, and/or voltage rebound compensation.

1 Claim, 5 Drawing Sheets

VOLTAGE REGULATOR

RELATED APPLICATIONS

This application is a continuation of co-pending U.S. patent application Ser. No. 14/202,774 filed 10 Mar. 2014, which is a divisional of U.S. patent application Ser. No. 12/960,154, filed 3 Dec. 2010 (now U.S. Pat. No. 8,681,521, issued 25 Mar. 2014), which claimed the benefit of U.S. Provisional Patent Application No. 61/283,404, filed 3 Dec. 2009.

BACKGROUND OF THE INVENTION

Embodiments of the present invention relate generally to the field of electronic voltage regulation and more specifically to improved voltage regulators used in alternating-current to at least substantially direct-current power conversion.

Generally, electrical power may be provided in electrical or electromechanical systems to enable desired electrical functionality. An example of desired electrical functionality may be the operation of lights and other accessories on vehicles that may also include an internal combustion engine, such as a lawn tractor, a motorcycle, or an automobile, for example. A common methodology that is utilized to provide electrical power on demand is a battery, which may hr contemporaneously charged with regulated voltage originating at an electrical power generator.

Most electrical power generators, such as those driven by internal combustion engines, are alternating current generators that utilize alternating magnetic fields to induce electrical power in one or more alternating current phases. It is often desirable to rectify and regulate the alternating current output of an electrical power generator to supplement the battery charge. A common rectification circuit that interfaces to an alternating-current generator (ACG) is a bridge rectification circuit that employs silicon controlled rectifiers (SCRs). The use of SCRs is generally recognized as the most economical and robust switching component, currently available.

While the general concept of voltage rectification and regulation is well known, various problems remain. For instance, one problem is the unequal load sharing between rectifier components in three-phase rectification circuits. Despite the unpredictable on-demand nature of voltage regulation, it has been found that certain situations may arise which cause a single rectifier component, such as an SCR, to be utilized more than the other components. When such is the case, the SCR that is used more frequently than the others is more likely to fail.

Other problems with present voltage regulation circuits are related to voltage droop. A first problem is the voltage droop, itself, which may be caused by battery cable and/or electrical connector losses, especially when such connectors are corroded. A second problem is a voltage rebound from a voltage droop in the event that a demand for electrical power is significantly reduced or eliminated.

Accordingly, the art of voltage regulation would benefit from one or more circuits capable of SCR load sharing, adaptive voltage droop compensation, and/or voltage rebound compensation.

SUMMARY OF THE INVENTION

Embodiments of voltage regulators according to the present invention employ one or more of the described features of SCR load sharing, adaptive voltage droop compensation, and/or voltage rebound compensation.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Voltage Regulator Circuit

Figure 1:
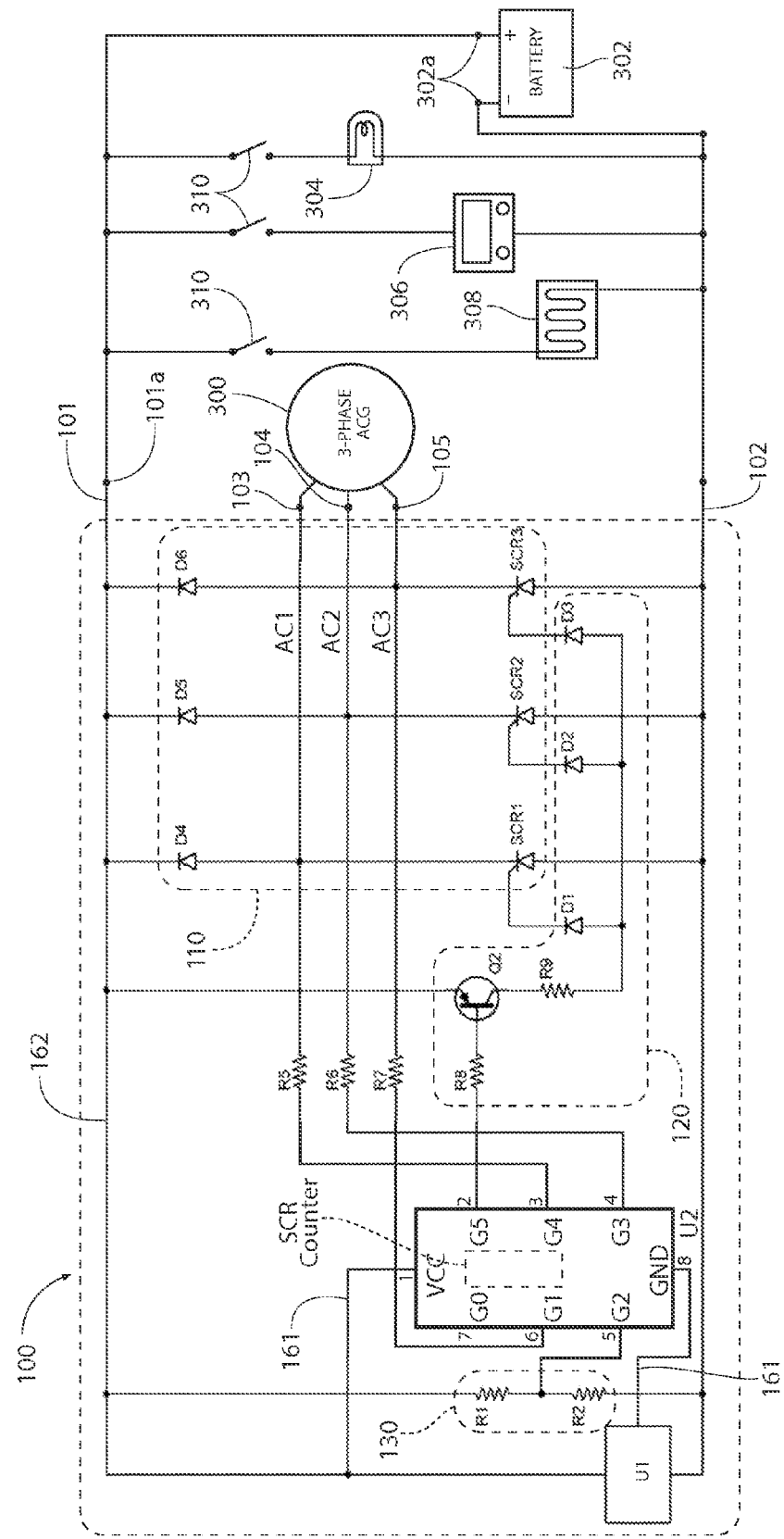
FIG. 1 is a schematic representation of a first voltage regulation circuit according to the present invention.

Turning now to the figures, FIG. 1 is the basic schematic of an embodiment 100 of an improved voltage regulator circuit 100 according to the present invention. Generally, the circuit 100 includes a rectifier circuit 110, a microprocessor U2, a voltage reference U1, and one or more switching circuits, such as an SCR control circuit 120. The circuit also includes a positive battery connection 101, a ground connection 102, a first AC input 103, a second AC input 104, and a third AC input 105. The voltage reference U1 is preferably a stable voltage reference, such as a shunt regulator, that provides power 161 for the microprocessor U2. The microprocessor U2 contains an analog-to-digital converter (not shown) which uses the applied power 161 from the voltage reference U1 as its reference voltage. A voltage divider 130 formed by resistors R1,R2 may be used to divide the battery voltage 162 down to within an acceptable range of the microprocessor U2 for sensing purposes. The phase timing of three AC signals, provided on the AC inputs 103,104,105 from an AC generator (ACG) 300 is monitored by the microprocessor U2 through dropping resistors R5,R6, R7. The SCR control circuit 120 may be comprised of a transistor Q2 operatively coupled to diodes D1,D2,D3, wherein drive resistors R8,R9 provide the gate drive current necessary to control the SCRs SCR1,SCR2,SCR3. That is, Q2 may be a PNP bipolar junction transistor, or a common collector cascade arrangement of same, wherein the collector is in electric communication, through one or more drive resistors R9, with the anodes of the diodes D1,D2,D3. The cathode of each diode D1,D2,D3 is then electrically coupled to a gate of a respective SCR. The rectifier 110 is comprised of three SCRs SCR1,SCR2,SCR3 in respective combination with three diodes D4, D5 and D6, thereby forming a three-phase full-wave rectifier which converts the AC signals of the ACG 300 into the at least substantially direct current voltage that may be used to charge a battery 302, which is electrically coupled as is known between the positive battery connection 101 and the ground connection 102, and operate the electrical devices that may be selectively coupled to the battery 302. Such devices may include, by way of nonlimiting examples, a light 304, a radio 306, and a heater 300, which may be electrically coupled to the battery 302 through switches 310.

In this arrangement, the microprocessor U2 may monitor the AC inputs 103,104,105, monitor the battery voltage 162, or divided representation thereof, and may control the provision of rectified electricity in a controlled manner when required or desired. A preferred microprocessor is a PIC12F510, 8-bit flash microcontroller, available from Microchip Technology, Inc., of Chandler, Ariz. Furthermore, although the regulator circuit 100 is shown to include functional components, it is to be understood that further components may be included or substituted. For instance, the switching circuit 120 will likely require proper transistor biasing, and the transistor Q2 may be provided, as mentioned, as a cascade arrangement. Furthermore, transient voltage suppression and other circuit components may be desirable, but are generally circuit design techniques that are presently known in the art. Additionally, the operation of the microprocessor U2 may also be achieved by using a combination of discrete electronic components, but the microprocessor U2 is preferred due to space and ease of minor functional alterations through programming.

SCR Load Sharing

In prior three-phase voltage regulator designs, three SCRs in a rectifier circuit were sized to handle slightly over one-third of the total current that is expected to be received from an ACG. However, it has been discovered that due to large current pulses received from the ACG, in combination with wiring and connector losses, there are many times when an R-C filter will trigger a single SCR, and then delay for a time period equal to almost a full cycle of the AC signals provided. This can result in repeated triggering of the same SCR, or same two SCRs, thus ultimately leaving one or more SCRs unused for some period of time. This situation can occur at any ACG speed with the proper loading on the regulator and occurs much more often as the power output of a given ACG increases. The result may be an over-heating of the repeatedly triggered SCRs, which may result in a lock up condition which may be reset by dropping the output of the ACG or reducing the load to a point where the locked SCR temperature drops below the critical lock-up temperature. Comparisons between prior analog regulators and regulators according to the present invention which provide SCR load sharing have shown a substantial difference in performance with similar SCRs. In many tests, the differences were dramatic.

A circuit provided and operated according to the present invention can ensure that the SCRs of a 3-phase regulator are triggered such that the load current will be shared at least substantially equally between the three SCRs SCR1,SCR2, SCR3 that are coupled to the respective AC inputs 103,104, 105. The microprocessor U2 examines the three AC inputs, preferably at a sampling rate of at least 20 to 1, more preferably of at least 26 to 1, and even more preferably at about 50 to 1. At the falling edge of each signal 103,104,105, the microprocessor U2 determines whether an SCR should be triggered, such as by sensing that the battery voltage 102, or a representation thereof, has dropped below a demand threshold voltage level, the microprocessor U2 examines a three-state counter to determine whether the SCR connected to the currently examined AC input is the next SCR that should be fired. Once the determined SCR is fired, the counter is advanced to the next state, in preparation to fire the next SCR in sequence, when the next voltage demand arises.

Figure 4:
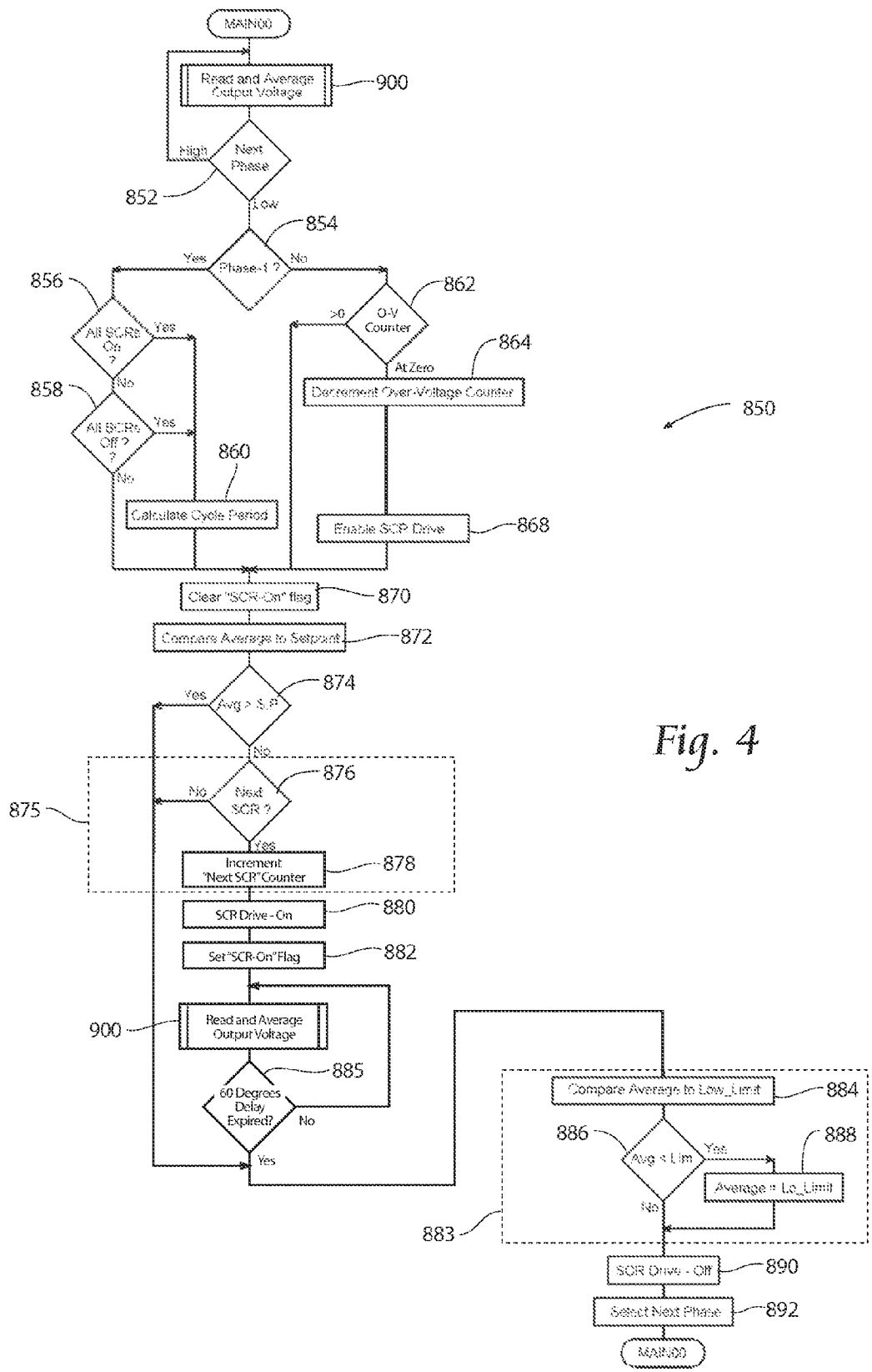
FIG. 4 is a flowchart of an embodiment according to the present invention of a method of voltage regulator control including optional SCR load sharing and voltage rebound compensation.

This method is more clearly shown in FIG. 4. At step 872, microprocessor U2 compares average output voltage to the setpoint. If it is determined that the average falls below the setpoint (decision point 874), the three-state counter function represented at 875 is engaged. If the currently connected SCR should be the next one to be fired (decision point 876), the counter is advanced to the next SCR, 878, and the SCR is fired, 880.

Figure 3:
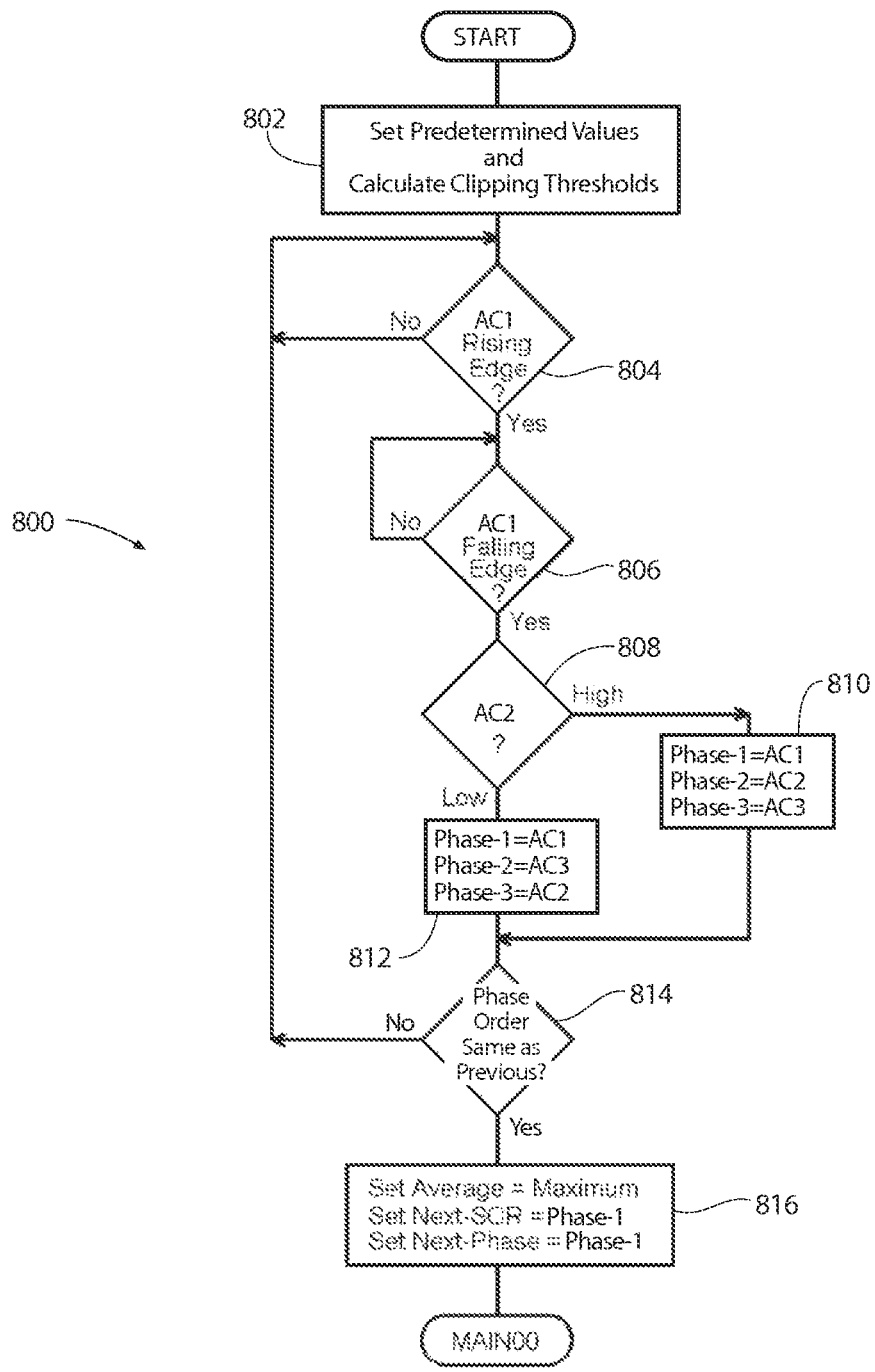
FIG. 3 is a flowchart of an embodiment according to the present invention of a method of determining the phase relationship of a plurality of AC input signals.

To determine the proper SCR sequence, the microprocessor U2 preferably analyzes the phase relationships of the AC signals provided on the AC inputs AC1,AC2,AC3. By sampling the AC inputs received at the microprocessor U2, a process for determining phase relationships can be used, as seen in FIG. 3. In determining phase relationships, AC1, which is coupled to SCR1 is always specified as Phase-1, or the first phase. Then, it is preferable to analyze AC2, to determine whether the phase relationship of the AC signals is AC1-AC2-AC3 or AC1-AC3-AC2. If the former, then AC2 will be defined as Phase-2 and AC3 will be defined as Phase-3. If the latter, then AC3 will be defined as Phase-2 and AC2 will be defined as Phase-3. In a quality assurance step 814, it is determined if a subsequent cycle has the same phase order, if not, the process is repeated until two consecutive cycles have been found to have the same phase relationship. This step is especially useful to trigger all three SCRs in desired order during heavy loading. For instance, if the ACG phase relationship is 1-3-2 and the counter triggers the SCRs in a 1-2-3 order, when SCR-1 is triggered, there will be a 120 degree gap before SCR-2 is triggered. This will be followed by a 120 degree gap before SCR-3 is triggered. The result will be a loss in overall power handling because the ACG will only be able to provide current for 50 percent of the time.

An alternate method of controlling the SCRs involves a complete cycling of all SCRs after power demand has been determined and prior to analyzing power demand. In this method, when the microprocessor U2 determines that power is required or desired, such as by sensing that the battery voltage 162, or a representation thereof, has dropped below a demand threshold voltage level, the microprocessor U2 generates a drive pulse which lasts for approximately the time period of one complete AC signal cycle. This ensures that all three SCRs are triggered once. At the end of such pulse, the microprocessor U2 may then determine whether continued power is required or desired. If so, then another cycle-long drive pulse can be initiated or maintained. However, this technique may result in excess output voltage ripple at low engine speeds or light loads, where power demand is sporadic. However, at high speeds such cycling may be desirable, as such ripple is likely to be minimized.

Adaptive Voltage Droop Compensation

Figure 2:
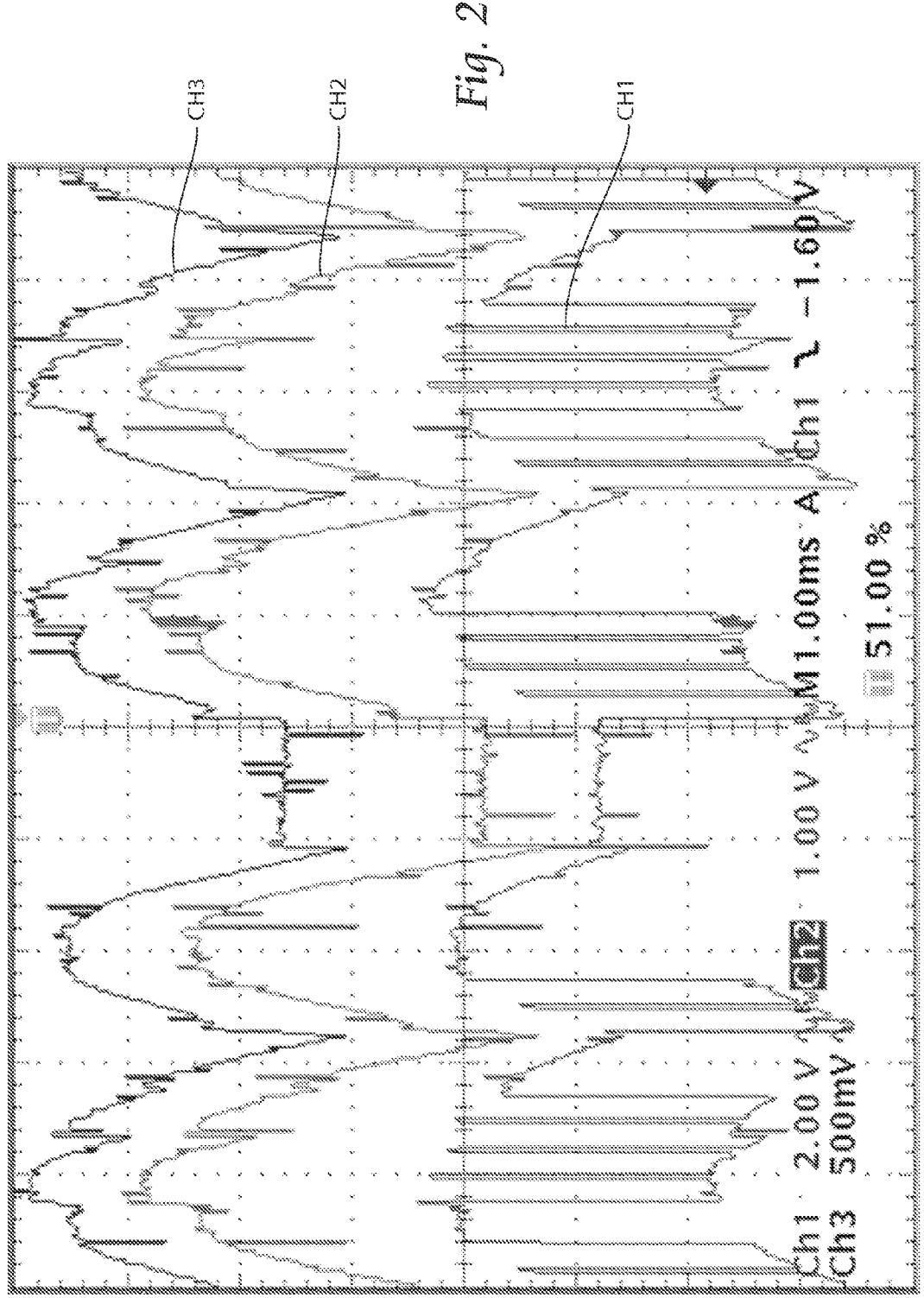
FIG. 2 is a representative oscilloscope trace of voltage physically measured at a first point, a voltage physically measured at a second point that is physically spaced from but in electrical communication with the first point, and SCR control signals.

Turning now to FIG. 2, representative oscilloscope traces are shown. In the scope traces, the top trace CH3 represents the voltage change physically measured at the battery 202 as the ACG 300 applies output current at various times. The middle trace CH2 represents the voltage physically measured at a physical distance from the battery 302, such as at the positive battery connection 101 of the regulator circuit 100. Theoretically, assuming ideal conduction between the battery 302 and the regulator 100, CH2 should directly correspond and overlap CH3. However, as can be seen, the voltage CH3 at the battery 302, measured at point 302a, rises about 1.1 volts between time zero at the center of the trace and 1.00 milliseconds or one time division. However, measured at the other end of the cabling, at point 101a, and through connectors used in a system, the voltage CH2 measured at the output of the regulator rises 3.0 volts during that same time period. Thus, if only the voltage CH2 at the regulator, 101a, is considered in the regulation process, the average will be skewed high. Without compensating for cabling and connector loss, the battery voltage CH3 could actually drop by 1.9 volts. Note the vertical voltage scale setting on the oscilloscope trace for CH3 is half the scale for CH2.

A circuit according to the present invention may clip peak voltage levels in the feedback path between the regulator output terminals and the regulator software low-pass filter when the regulator has activated the SCRs between the ACT 300 and the battery 302. These peaks occur due to the losses in the cable and connectors and are not representative of the actual battery voltage. As a result, the voltage on the low-pass filter will more closely represent the actual battery voltage, thereby ignoring connection losses.

The microprocessor reads the output voltage of the regulator with an Analog-to-Digital converter on a periodic basis and averages the readings using the following formula:

$$New\_Avg=Old\_Avg+((New\_Reading-Old\_Avg)/256),$$

where Old_Avg equals the previously calculated New_Avg and New_Reading is a digital representation of a voltage level sensed by the A-D converter, preferably an 8-bit digital value. This is a commonly used low-pass algorithm. However, it has been discovered that when the SCRs in the voltage regulator are active, the New_Reading values may adversely affect the filtering and manipulation of the New_Reading value during active voltage regulation provides adaptive voltage droop compensation.

Figure 5:
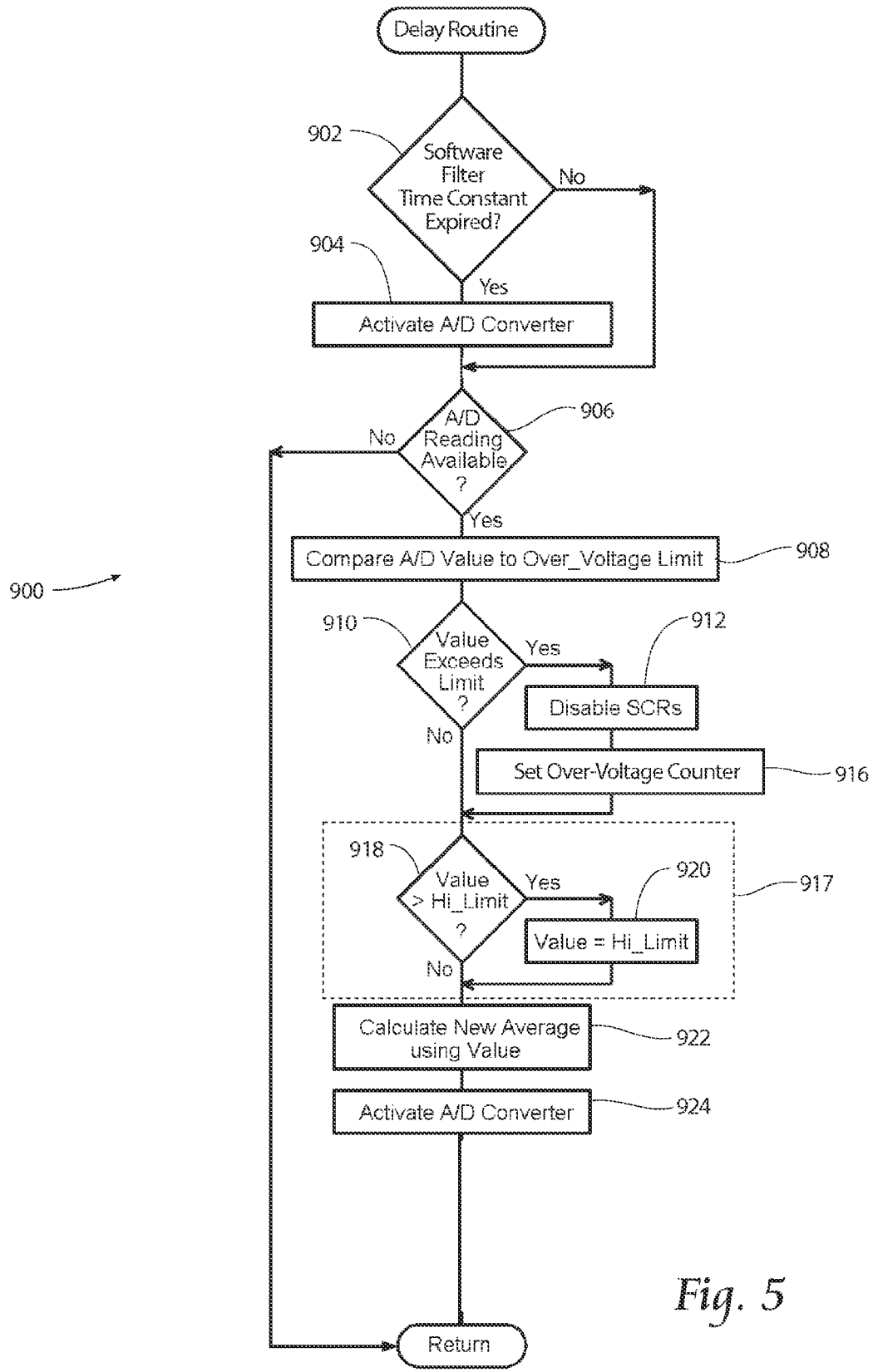
FIG. 5 is a flowchart of an embodiment according to the present invention of a method of software voltage averaging, including optional adaptive voltage droop compensation.

During normal operation, the microprocessor U2 waits until it is time to trigger an SCR. It does this by monitoring the respective AC signal for a high-to-low transition. For instance, if SCR1 is to be fired, then the microprocessor U2 analyzes the AC signal through R5 from the first AC input 103 for a high-to-low transition. Then, the microprocessor U2 compares the present Old_Avg value to a predetermined variable, but preferably fixed, number which represents a desired battery voltage. If the Old_Avg is below the desired value, the SCR is triggered and a "Conduction Flag" is set in the microprocessor's onboard random access memory (RAM). If the Old_Avg is above the desired value, no trigger pulse occurs and the "Conduction Flag" is preferably cleared. As the microprocessor U2 waits for the next High-to-Low phase transition of the ACG phase, or AC input, which has been determined to be the next phase adjacent in time to the current phase, it continues to monitor the voltage provided by the voltage divider 130. But, if the "Conduction Flag" is set and the New_Reading value exceeds a predetermined clipping threshold amount, which is greater than or equal to the predetermined desired battery voltage, predetermined clipping threshold is substituted for the New_Reading in the averaging algorithm. Therefore, despite the voltage loss in the electric cabling and connectors, the averaging algorithm compensates by ignoring excessive voltage levels that may occur during regulation, thereby limiting the effects of such losses. This may be especially advantageous in systems in which the losses are expected or predicted to change over time, such as through corrosion or fracture. An example 917 of a method of performing this adaptive voltage droop compensation 917 can be seen in FIG. 5. This Figure also depicts the general voltage averaging process. In a timer check step 902, a timer is evaluated to determine if the programmable time constant of the software low pass filter has expired. Such time constant may be selectively chosen for circuit performance, but is preferably on the order of 100 microseconds to 200 microseconds, and more preferably about 128 microseconds. Furthermore, if an overvoltage condition arises, the over-voltage counter is set 916 with a counter value to delay a desired amount of time, preferably about five seconds.

Voltage Rebound Compensation

It has also been discovered that upon addition of a demanding load to the circuit of the battery 302, thus rapidly increasing power demand and decreasing perceived battery voltage 162, the extremely low voltage level sensed by the microprocessor may skew the averaging algorithm of the software low-pass filter, thereby causing an apparent power shortage that would otherwise demand significant voltage from the regulator. Thus, if the demanding load is removed from the circuit, the battery voltage 162 may overshoot the desired level because the average provided by the low-pass filter has been skewed low.

A circuit according to the present invention may clip voltage levels presented to the microprocessor U2 software low-pass filter which are much lower than the predetermined desired battery voltage level. Since any voltage on the low-pass filter which is below a desired voltage level generally would activate the SCRs located between the ACG 300 and the battery 302, a very low level voltage provided to the software low-pas filter is an indication that the system current demands have exceeded the output current of the ACG 300. By limiting the floor voltage presented to the low-pass filter to a predetermined, variable but preferably static level, a low clipping threshold, which is below the desired voltage level, the battery voltage 162 will not overshoot above the predetermined desired voltage level when the excessive load is removed. Before the microprocessor U2 compares the Old_Avg to the predetermined desired value, the Old_Avg is compared to the predetermined low clipping threshold. If the Old_Avg value is below the low clipping threshold, the value of the Old_Avg is set to the low clipping threshold value. Because the low clipping threshold is below the desired value, the SCRs will be driven ON until the New_Avg increases to above the predetermined desired value. This clipping generally only occurs if the system load exceeds the maximum ACG output capability. Instead of a protracted recovery in the event of a fast removal of the load, the clipping will result in a very short duration between the time that the load is removed and the time when the New_Avg value rises above the predetermined desired value and turns off the SCRs. The result is a reduction in the maximum peak battery voltage. This reduces stresses in sensitive electrical equipment. An example 883 of a method of performing this voltage rebound compensation can be seen in FIG. 4.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A multi-phase voltage regulator comprising:
a plurality of alternating current inputs;
a plurality of silicon controlled rectifiers, each silicon controlled rectifier being electrically coupled to one of the plurality of alternating current inputs; and
an electrical circuit including:
  a battery voltage input; and
  a plurality of phase inputs, wherein the plurality of phase inputs is at least equal in number as the plurality of alternating current inputs,
wherein the electrical circuit is configured to sense alternating current electronic signals received through the phase inputs and to sense a voltage level signal received through the battery voltage input,
wherein the electrical circuit is configured to compare the voltage level signal to a predetermined voltage reference level, and
wherein the electrical circuit is configured to determine the silicon controlled rectifier fired first in an immediately preceding activation step, to activate and deactivate all of the plurality of silicon controlled rectifiers starting with one of the plurality of silicon controlled rectifiers not determined to be the silicon controlled rectifier fired first in the immediately preceding activation step, and where each activation occurs only when the voltage level signal is below the predetermined voltage reference level further comprising:
a three-state counter, wherein each state of the three-state counter is associated with one of the plurality of silicon controlled rectifiers;
whereby a current state of the three-state counter determines which silicon controlled rectifier will be fired first in the activation step; and upon firing a silicon controlled rectifier associated with the current state of the three-state counter, the three-state counter is configured to advance to a subsequent state in preparation for firing the silicon controlled rectifier associated with a subsequent state first when the battery voltage is below the determined voltage reference level.

* * * * *